United States Patent
Nose et al.

(10) Patent No.: US 10,373,768 B2
(45) Date of Patent: Aug. 6, 2019

(54) METHOD FOR PRODUCING ELECTRODE FILM FOR ELECTRIC DOUBLE LAYER CAPACITORS

(71) Applicant: Nippon Valqua Industries, Ltd., Tokyo (JP)

(72) Inventors: Masaaki Nose, Gojo (JP); Yasuo Ichikawa, Gojo (JP)

(73) Assignee: Valqua, Ltd., Tokyo (JP)

( * ) Notice: Subject to any disclaimer, the term of this patent is extended or adjusted under 35 U.S.C. 154(b) by 256 days.

(21) Appl. No.: 14/910,366

(22) PCT Filed: Aug. 1, 2014

(86) PCT No.: PCT/JP2014/070306
§ 371 (c)(1),
(2) Date: Feb. 5, 2016

(87) PCT Pub. No.: WO2015/019947
PCT Pub. Date: Feb. 12, 2015

(65) Prior Publication Data
US 2016/0196931 A1 Jul. 7, 2016

(30) Foreign Application Priority Data

Aug. 6, 2013 (JP) .................................. 2013-163047

(51) Int. Cl.
H01G 11/38 (2013.01)
H01G 11/86 (2013.01)
H01G 11/42 (2013.01)

(52) U.S. Cl.
CPC ............. *H01G 11/86* (2013.01); *H01G 11/38* (2013.01); *H01G 11/42* (2013.01); *Y02E 60/13* (2013.01)

(58) Field of Classification Search
CPC ........ H01G 11/86; H01G 11/42; H01G 11/38; Y02E 60/13
See application file for complete search history.

(56) References Cited

U.S. PATENT DOCUMENTS

| | | | |
|---|---|---|---|
| 6,246,568 B1 | 6/2001 | Nakao et al. | |
| 6,778,379 B2* | 8/2004 | Iwaida | H01G 11/38 29/25.03 |
| 6,887,617 B2 | 5/2005 | Sato et al. | |
| 2004/0170821 A1 | 9/2004 | Iwaida et al. | |
| 2005/0136187 A1 | 6/2005 | Weber et al. | |
| 2006/0148191 A1* | 7/2006 | Mitchell | H01G 9/016 438/396 |
| 2007/0122698 A1* | 5/2007 | Mitchell | H01G 11/38 429/217 |
| 2007/0274023 A1 | 11/2007 | Mori et al. | |
| 2008/0030924 A1 | 2/2008 | Mori et al. | |
| 2008/0291775 A1* | 11/2008 | Ozaki | H01G 9/058 366/186 |
| 2009/0154061 A1 | 6/2009 | Nanba et al. | |

FOREIGN PATENT DOCUMENTS

| | | |
|---|---|---|
| CN | 1873867 A | 12/2006 |
| CN | 101213626 A | 7/2008 |
| CN | 101894681 A | 11/2010 |
| JP | 467610 A | 3/1992 |
| JP | H06-042120 U * | 6/1994 |
| JP | 2562654 Y2 | 2/1998 |
| JP | 2001230158 A | 8/2001 |
| JP | 2002105124 A | 4/2002 |
| JP | 3776875 B2 | 5/2006 |
| JP | 2007516080 A | 6/2007 |
| JP | 201398002 A | 5/2013 |
| TW | 550848 B | 9/2003 |
| WO | 98/58397 A1 | 12/1998 |
| WO | 2005124801 A1 | 12/2005 |

OTHER PUBLICATIONS

Translation of JP H06-042120 U (Year: 1994).*
S. Sasabe. PT-X. Published on Youtube on Jan. 9, 2012. url: https://www.youtube.com/watch?v=tfrrm3b84Jw (Year: 2012).*

* cited by examiner

*Primary Examiner* — Matthew J Daniels
*Assistant Examiner* — Leith S Shafi
(74) *Attorney, Agent, or Firm* — The Webb Law Firm

(57) ABSTRACT

Provided is a method for producing a high-strength electrode film for an EDLC, where scraps generated when producing the electrode film are reusable. The method for producing an electrode film for an electric double-layer capacitor includes a step of kneading a carbonaceous powder, a conductive assistant, and a fluororesin binder, and producing a shaped product from the obtained kneaded product, a step of pulverizing the shaped product to produce a modifying material having an average particle diameter of 5 to 100 μm, and a step of kneading a carbonaceous powder, a conductive assistant, a fluororesin, and the modifying material in a ratio of 1 to 40% by weight of the modifying material with respect to 100% by weight in total of the carbonaceous powder, the conductive assistant, the fluororesin, and the modifying material, and rolling the obtained kneaded product to produce an electrode film for an electric double-layer capacitor.

2 Claims, No Drawings

METHOD FOR PRODUCING ELECTRODE FILM FOR ELECTRIC DOUBLE LAYER CAPACITORS

CROSS-REFERENCE TO RELATED APPLICATIONS

This application is the United States national phase of International Application No. PCT/JP2014/070306 filed Aug. 1, 2014, and claims priority to Japanese Patent Application No. 2013-163047 filed Aug. 6, 2013, the disclosures of which are hereby incorporated in their entirety by reference.

TECHNICAL FIELD

The present invention relates to a method for producing an electrode film for an electric double-layer capacitor.

TECHNICAL BACKGROUND

As a method for producing an electrode film for an electric double-layer capacitor (hereinafter referred to also as "EDLC"), there is conventionally known a production method in which activated carbon, carbon black, and a binder such as PTFE) are kneaded and then shaped into a sheet (for example, Patent Literature 1).

However, it is considered to be difficult for this method to sufficiently improve density of carbon micro-powder (activated carbon) in an electrode. Accordingly, Patent Literature 2 proposes a method for producing a polarizable electrode for a capacitor, the method comprising mixing and kneading raw materials including a carbonaceous powder, a conductive assistant, and a binder to obtain a kneaded product and then forming the kneaded product into a sheet-shaped product having a predetermined thickness by roll press, in which the kneaded product is obtained by drying and press molding a primary kneaded product prepared by mixing and kneading the raw materials, followed by pulverizing and classifying. In Patent Literature 2, it is described that this method can improve density of carbon micro-powder in the polarizable electrode and thus can contribute to increase the capacitance of a capacitor.

In addition, Patent Literature 3 discloses a method for producing a sheet-shaped polarizable electrode for an electric double-layer capacitor, the method comprising mixing and kneading raw materials including a carbonaceous powder, a conductive assistant, and a binder to obtain a kneaded product, finely graining the kneaded product to produce a shaping material, and shaping and rolling the shaping material into the electrode. It is a method for producing a polarizable electrode for an electric double-layer capacitor, which uses, as the shaping material obtained by fine graining of the kneaded product, a shaping material of lump-shaped particles having a particle diameter ranging from 47 μm or more to less than 840 μm. It is described that this method can produce a polarizable electrode having high tensile strength. Patent Literature 3 describes a method for finely graining a kneaded product in which the kneaded product is shredded by a shredding blade.

CITATION LIST

Patent Literatures

Patent Literature 1: JP-A-H4(1992)-67610
Patent Literature 2: JP-A-2001-230158
Patent Literature 3: Japanese Patent No. 3776875

SUMMARY OF THE INVENTION

Technical Problems

However, there is room for improvement in terms of strength in an electrode film for an EDLC obtained by a production method (for example, Patent Literature 1) in which simply, a carbonaceous power, a conductive assistant, and a fluororesin binder are kneaded to be formed into a sheet and in an electrode film for an EDLC obtained by the production method described in Patent Literature 2 or Patent Literature 3.

In addition, in all of the production methods of Patent Literatures 1 to 3, scraps are generated when cutting a produced sheet-shaped product into a desired shape to form an electrode film for an EDLC. Thus, reuse of the scraps is desired.

The present invention has been accomplished in view of such problems of the conventional techniques, and it is an object of the invention to provide a method for producing a high-strength electrode film for an EDLC, where scraps generated when producing the electrode film are reusable.

Solution to the Problems

The present invention relates to, for example, the following [1] to [3].

[1]

A method for producing an electrode film for an electric double-layer capacitor, the method comprising:

a step (a1) of kneading a carbonaceous powder, a conductive assistant, and a fluororesin binder, and producing a shaped product from the obtained kneaded product;

a step (a2) of pulverizing the shaped product to produce a modifying material having an average particle diameter of 5 to 100 μm; and a step (b) of kneading a carbonaceous powder, a conductive assistant, a fluororesin, and the modifying material in a ratio of 1 to 40% by weight of the modifying material with respect to 100% by weight in total of the carbonaceous powder, the conductive assistant, the fluororesin, and the modifying material, and rolling the obtained kneaded product to produce an electrode film for an electric double-layer capacitor.

[2]

The method for producing an electrode film for an electric double-layer capacitor according to the above [1], in which the modifying material has an angle of repose of 45 degrees or less.

[3]

The method for producing an electrode film for an electric double-layer capacitor according to the above [1] or [2], comprising irradiating the shaped product or a pulverized product thereof with an electron beam at the step (a2).

Advantageous Effects of the Invention

The method for producing an electrode film for an EDLC of the present invention can produce a high-strength electrode film for an EDLC. Additionally, scraps generated when cutting a sheet-shaped product to obtain an electrode film for an EDLC can be reused as the shaped product to be pulverized at the step (a2).

MODES FOR CARRYING OUT THE INVENTION

Hereinafter, embodiments of the present invention will be described in detail.

A method for producing an electrode film for an EDLC of the present invention comprises:

a step (a1) of producing a shaped product by using a carbonaceous powder, a conductive assistant, and a fluororesin binder;

a step (a2) of pulverizing the shaped product to produce a modifying material; and a step (b) of producing an electrode film for an EDLC by using a carbonaceous powder, a conductive assistant, a fluororesin, and the modifying material.

Step (a1);

At the step (a1), a carbonaceous powder, a conductive assistant, and a fluororesin binder are kneaded, and a shaped product is produced from the obtained kneaded product.

Examples of the carbonaceous powder include porous carbon materials such as activated carbon and activated carbon fiber, which have large specific surface area, and graphite-like micro-crystalline carbon produced by subjecting a carbon material to activating treatment. As the carbonaceous powder, activated carbon is preferable. The carbonaceous powder has a specific surface area of preferably about 1,000 to 2,500 $m^2/g$.

In an electric double-layer capacitor, the carbonaceous powder exhibits an action of adsorbing anions and cations present in an electrolytic solution to form an electric double-layer and storing electric power.

The ratio of the carbonaceous powder largely influences improvement in energy density per unit area in an EDLC. Thus, the ratio thereof with respect to 100% by weight in total of the carbonaceous powder, the conductive assistance, and the fluororesin binder to be used at the step (a1) is preferably 60 to 93% by weight. In cases where the electrode film of the invention is used for an EDCL for high output density, such as for an electric automobile, the ratio of the carbonaceous powder is preferably 70 to 90% by weight.

Examples of the conductive assistant include acetylene black, channel black, furnace black, and ketchen black. These may be used singly or in combination of two or more kinds thereof.

The conductive assistant improves electrical conductivity between the carbonaceous powder and the carbonaceous powder and electrical conductivity between the carbonaceous powder and a current collector.

The ratio of the conductive assistant with respect to 100% by weight in total of the carbonaceous powder, the conductive assistant, and the fluororesin binder to be used at the step (a1) is preferably 3% by weight or more since an internal resistance of the electrode film can be suppressed at low level and an electric double-layer capacitor having high output density can be produced, and is preferably 15% by weight or less since the ratio of a carbon micro-powder in the electrode film can be relatively increased, so that an electrode film in having high energy density can be produced.

Examples of a fluororesin in the fluororesin binder include polytetrafluoroethylene (PTFE), ethylene-tetrafluoroethylene copolymers, ethylene-chlorotrifluoroethylene, fluorovinylidene copolymers, and tetrafluoroethylene-perfloroalkylene vinylether copolymers. Among them, polytetrafluoroethylene is preferable since it is chemically stable.

The ratio of the fluororesin binder with respect to 100% by weight in total of the carbonaceous powder, the conductive assistant, and the fluororesin binder to be used at the step (a1) is preferably 4% by weight or more, and more preferably 5% by weight or more from the viewpoint of increasing a tensile strength of the electrode film, and is 25% by weight or less, and preferably 15% by weight or less from the viewpoint of suppressing an internal resistance of the electrode film at low level.

In kneading the obtained mixed product, a forming aid may further be added to the mixed product in order to promote fiberization of the fluororesin binder by kneading.

Examples of the forming aid include water, monohydric alcohols such as methanol and ethanol, and polyhydric alcohols such as ethylene glycol, propylene glycol, and glycerin. Monohydric alcohols are preferable from the viewpoint of moldability.

The amount of the forming aid is preferably 80 parts by weight or more, and more preferably 100 to 600 parts by weight, with respect to 100 parts by weight in total of the carbonaceous powder, the conductive assistant, and the fluororesin binder to be used at the step (a1).

Preferably, the forming aid is removed by heating or the like when shaping the kneaded product or after that.

As operations in the production of the shaped product from the carbonaceous powder, the conductive assistant, and the fluororesin binder at the step (a1), there can be applied conventionally known operations such as a kneading operation and a shaping operation in the production of an electrode for an EDLC from a carbonaceous powder, a conductive assistant, and a fluororesin binder.

When the carbonaceous powder, the conductive assistant, the fluororesin binder, and optionally, the forming aid are sufficiently kneaded while applying a shear stress, the fluororesin binder becomes microfibrous, whereby the carbonaceous powder, the conductive assistant, and the fluororesin binder are bonded to each other.

A pressure kneader can be used for the kneading. In addition, the temperature of the kneading can be any temperature as long as it is a temperature at which the fluororesin exhibits sufficient fluidity, and is, for example, about 20 to 120° C.

Examples of a method for obtaining the shaped product from the obtained kneaded product include a method comprising preliminarily shaping the kneaded product into a rod shape or a plate shape by a method such as extrusion or rolling and furthermore shaping the obtained product into a sheet shape by a method such as rolling by a rolling roll. When using a rolling roll in shaping, the temperature of the rolling roll is preferably 20 to 100° C., and more preferably 40 to 80° C.

Additionally, when removing the forming aid by heating after the step of rolling the kneaded product, the temperature of the heating is, for example, 100 to 200° C., and the time of the heating is, for example, 5 minutes to 5 hours.

Step (a2);

At the step (a2), the shaped product obtained at the step (a1) is pulverized to produce a modifying material having a particle diameter of 5 to 100 μm. The shaped product may be a scrap of an electrode film generated in any conventionally known process for producing an electrode film including a carbonaceous powder, a conductive assistant, and a fluororesin binder or a scrap generated when producing an electrode film by the production method according to the present invention. Accordingly, the present invention allows reuse of such a scrap of the electrode film. Additionally, in the production method of the present invention, pulverization of the shaped product can be performed, for example, by rotating a material cutting blade, a material pulverizing hammer, or the like at high speed in a housing and introducing the shaped product therein. In order to finely pulverize the shaped product, a screen mill for medium grinding (for example, TP series manufactured by Horai Co. Ltd., FM series manufactured by Hosokawa Micron Co., Ltd., or CI series manufactured by Makino Industry Co., Ltd) is preferably used.

The particle diameter of the modifying material to be produced at the step (a2) is 5 µm or more and preferably 6 µm or more from the viewpoint of maintaining the modifying material by the binder to prevent powder falling of the electrode film, and is 100 µm or less and preferably 90 µm or less from the viewpoint of forming the electrode film uniformly and without hole formation, or the like. In addition, the values of the particle diameter are values obtained when measured by a method employed in Examples to be described later or an equivalent method.

The values of the particle diameter can be increased or reduced by changing of pulverization time or electron beam irradiation time, or the like, and the value thereof tends to become smaller as these times become longer.

In addition, the modifying material has an angle of repose of preferably 45 degrees or less from the viewpoint of favorably dispersing the modifying material in kneading each raw material at the step (b) to prevent the formation of a hole in the electrode film or the occurrence of unevenness in strength of the electrode film.

The value of the angle of repose is a value obtained when measured by the following method or an equivalent method. (Method for Measuring Angle of Repose)

Measurement is performed using a powder tester PT-X manufactured by Hosokawa Micron Co. Ltd. Specifically, first, a powder collection board having a diameter of 80 mm is placed, and then a funnel having a nozzle with an inner diameter of 7 mm is placed so that the lower end of the nozzle is positioned at a height of 75 mm from the powder collection board. The modifying material is supplied into the funnel while being vibrated using a dispersing sieve, and is gently fallen from the funnel onto the powder collection board, followed by measurement of an angle (an angle of repose) formed by an inclined surface of a conical powder layer formed on the powder collection board and a horizontal surface.

The value of the angle of repose can be increased or reduced by changing of pulverization time or electron beam irradiation time, or the like, and the value tends to be smaller as these times become longer.

At the step (a2), preferably, the shaped product obtained at the step (a1) or a pulverized product thereof is irradiated with an electron beam. Electron beam irradiation allows the fiber of the fluororesin binder in the shaped product to be cut short, whereby the modifying material is uniformly mixed into the entire raw material and thus an electrode film having a uniform structure can easily be obtained. Eventually, the electrolytic solution is uniformly impregnated into the electrode film, so that effects of low internal resistance and improved electrostatic capacitance are exhibited.

As a method for electron beam irradiation, conventionally known methods can be applied. For example, electron beam irradiation may be performed using a process vessel as disclosed in Japanese Utility Model Registration No. 2562654.

The electron beam is, for example, γ-rays from a cobalt 60 irradiation source.

The dose of the electron beam is preferably 3 kGy or more, and more preferably 4 kGy or more, from the viewpoint of producing a modifying material having a small particle diameter by cutting short the fiber of the fluororesin binder. This effect is not very different even if the dose is too high. Accordingly, the dose is preferably 10 kGy or less, and more preferably 6 kGy or less.

When the pulverized product is irradiated with an electron beam, the pulverized product may further be pulverized after the irradiation.

After the shaped product is pulverized, the pulverized product is preferably classified.

Classification of the pulverized product can be performed by any conventionally known method. In addition, pulverization and classification may be performed by providing a sieve in a pulverizer for pulverizing the shaped product.
Step (b);

At the step (b), a carbonaceous powder, a conductive assistant, a fluororesin binder, and the modifying material are kneaded in a given ratio, and the obtained kneaded product is rolled to produce an electrode film for an EDCL.

In other words, at the step (b), except for using the modifying material as one of the raw materials, it is possible to apply any conventionally known method for producing an electrode film for an EDCL comprising rolling a kneaded product of a carbonaceous powder, a conductive assistant, and a fluororesin binder.

Details of the carbonaceous powder, the conductive assistant, and the fluororesin binder to be kneaded at the step (b) (specific examples, a mixing ratio between these three components, and the like) are as described above.

The mixing ratio of the modifying material with respect to 100% by weight in total of the carbonaceous powder, the conductive assistant, the fluororesin binder, and the modifying material to be kneaded at the step (2) is 1 to 40% by weight, and preferably 10 to 30% by weight. The strength of the electrode film largely depends on the amount of the fluororesin binder and to what extent the (non-fiberized) fluororesin binder is fiberized by shearing at the step (b). When the modifying material is mixed in the above ratio, the fluororesin binder is easily subjected to sharing, whereby fiberization thereof proceeds and the strength of the electrode film improves. On the other hand, when the ratio thereof is excessively smaller than 1% by weight, moldability of the electrode film tends to be reduced. In addition, in the process for producing the modifying material, the fibrous binder is repeatedly cut and rolled, and thus the fluororesin binder in the modifying material has a low binding force. Furthermore, when the mixing ratio of the modifying material is excessively high, the fluororesin binder is subjected to excessive shearing, thereby causing breakage of the fiber. Accordingly, when the above ratio is excessively higher than 40% by weight, the strength of an obtained electrode film is reduced.

The carbonaceous powder, the conductive assistant, the fluororesin binder, and the modifying material may be kneaded together with a forming aid.

As the forming aid, the above-described substances can be used. From the viewpoint of moldability, monohydric alcohols are preferable.

The amount of the forming aid is preferably 80 parts by weight or more, and more preferably 100 to 600 parts by weight, with respect to 100 parts by weight in total of the carbonaceous powder, the conductive assistant, the fluororesin binder, and the modifying material to be used at the step (b).

Preferably, the forming aid is removed by heating or the like when shaping the kneaded product into an electrode film or after that.

The method for rolling the obtained kneaded product is not particularly limited. Examples of the method include a method in which the kneaded product is preformed into a rod shape or a plate shape by a method such as extrusion or rolling, and the obtained product is shaped into a sheet shape by a method such as rolling by a rolling roll. When using a rolling roll in shaping, the temperature of the rolling roll is preferably 20 to 100° C., and more preferably 40 to 80° C.

Additionally, when removing the forming aid by heating after the step of rolling the kneaded product, the temperature of the heating is, for example, 100 to 200° C., and the time of the heating is, for example, 5 minutes to 5 hours.

The sheet-shaped product obtained by rolling may be used as an electrode film for an EDLC directly; after repeating the rolling a plurality times in order to control the thickness of the electrode film with higher precision or further to increase density of the electrode film; or after being cut into a desired size.

EXAMPLES

Hereinafter, the present invention will be described in more detail by Examples. However, the invention is not limited at all to these Examples.
<Measurement Methods>
1. Modifying Material;

Modifying materials produced in processes of Examples and the like were subjected to measurements as follows.
(Average Particle Diameter)

Modifying material was dispersed in water, and a particle distribution thereof was measured using a laser diffraction particle size distribution analyzer (trade name "SALD-7000" manufactured by Shimadzu Corporation). A value of D50 was defined as an average particle diameter of the modifying material.
(Angle of Repose)

The angle of repose was measured by the above-described method.
2. Electrode Film;

Each electrode film produced by Examples and the like was subjected to measurement and evaluation as follows.
(Density)

With respect to density, the electrode film was punched out into 50 mm×80 mm and evaluated.
(Internal Resistance and Electrostatic Capacitance)

In each Example and the like, the electrode film was punched out into a size with a diameter of 16 mm. Two electrode films thus punched out were prepared and faced to each other via a separator (a PTFE membrane filter: thickness 50 μm) in such a manner as to contact with the separator. Then, these were soaked in an electrolytic solution (a polycarbonate solution (1 M) whose solute is tetraethylammonium tetrafluoroborate, manufactured by Toyo Gosei Co., Ltd.) and placed in an open cell.

After the open cell was fully charged at a constant voltage (2.7 V), discharging with a constant current (5 mA) was performed and values of initial internal resistance and electrostatic capacitance were obtained from the obtained discharge curve.
(Powder Fall Properties)

One surface of the electrode film was touched with a finger and evaluation was performed on the basis of the following criteria.

AA: Powder hardly sticks to the finger.
BB: Powder slightly sticks to the finger.
CC: Powder sticks to the finger to such an extent that the powder blackens the finger.
(Strength of Electrode Film)

Each electrode film produced in Examples or Comparative Examples was punched out by a dumbbell No. 1. Both ends of the obtained test piece were chucked, and the test piece was stretched uniaxially in a vertical direction at a rate of 5 mm/min to measure a tensile strength at a time when the test piece was fractured.

Example 1

Step (a1)

80 parts by weight of an activated carbon (average particle diameter: 25 μm, specific surface area: 1600 to 1700 $m^2/g$, coconut shell activated carbon), 10 parts by weight of a conductive carbon black (Ketchen black EC, manufactured by Ketchen Black International Company), and 10 parts by weight of PTFE (POLYFLON D-1E, manufactured by Daikin Industries, Ltd.) were mixed together. Additionally, 150 parts by weight of a forming aid (ethanol) was added, and these were kneaded at 30° C.

The obtained kneaded product was extruded and molded under a condition of an extrusion rate of 6000 mm/min to obtain a rod-shaped preformed body in which a cross section perpendicular to a longitudinal direction of the rod had an oval shape having a diameter of 18 mm in a compression direction and a diameter of 32 mm in a lateral direction orthogonal to the compression direction and the rod had a length of 0.2 m. The obtained rod-shaped preformed body was rolled by a roll rolling machine under conditions of a rolling roll temperature of 60° C. and a pressure of 800 to 1100 kg/cm to obtain a sheet having a thickness of 0.8 mm and a width of 150 mm.

Step (a2)

The obtained sheet was dried at 120° C. for 1 hour, and next pulverized by a screen mill for medium grinding (FM-2 manufactured by Hosokawa Micron Co. Ltd.) so as to have a particle diameter of 2 mm or less, thereby to obtain pulverized particles.

The pulverized particles were irradiated with an electron beam of 5 kGy, and again, pulverization and classification were performed by the screen mill for medium grinding to obtain a modifying material B having an average particle diameter of 90 μm and an angle of repose of 44 degrees. In addition, irradiation conditions of the electron beam were as follows.

Irradiation apparatus: photoelectron spectrometer JPS-9010MX, manufactured by Radia Industry Co., Ltd.
Irradiation Conditions:
X-ray source: MgKα (output: 10 kV, 10 mA)
Photoelectron take-off angle: 45 degrees
Pass Energy: 50 eV
Number of sweeps: 1 time
Step size: 0.1 eV Step (b)

80 parts by weight of an activated carbon (average particle diameter: 25 μm, specific surface area: 1600 to 1700 $m^2/g$, coconut shell activated carbon), 10 parts by weight of a conductive carbon black (Ketchen black EC, manufactured by Ketchen Black International Company), and 10 parts by weight of PTFE (POLYFLON D-1E, manufactured by Daikin Industries, Ltd.) were mixed together to obtain a mixed product A. The modifying material B was additionally added to the mixed product A, and these were kneaded using a kneader at a rotation rate of 200 rpm and a temperature of 30° C. for 30 minutes. In addition, the mixing ratio of the mixed product A and the modifying material B (mixed product A:modifying material B) was 70% by weight: 30% by weight.

The obtained kneaded product was extruded and molded under a condition of an extrusion rate of 6000 mm/min to form a rod-shaped preformed body in which a cross section perpendicular to a longitudinal direction of the rod had an oval shape having a diameter of 18 mm in a compression direction and a diameter of 32 mm in a lateral direction orthogonal to the compression direction and the rod had a length of 0.2 m. The obtained rod-shaped preformed body was rolled by roll rolling under conditions of a rolling roll temperature of 60° C. and a pressure of 800 to 1100 kg/cm to obtain a sheet having a thickness of 0.8 mm and a width of 150 mm.

The obtained sheet was furthermore rolled under the same conditions and dried at 120° C. for 1 hour to obtain an electrode film having an average thickness of about 200 μm. Table 1 shows evaluation results of the electrode film.

Example 2

An electrode film was obtained by performing the same operation as in Example 1, except that at the step (a2), the classifying condition was changed to set the average particle diameter of the modifying material B to 50 μm and, at the step (b), the mixing ratio (mixture A:modifying material B) was changed to 90% by weight: 10% by weight. Table 1 shows evaluation results of the electrode film.

Example 3

An electrode film was obtained by performing the same operation as in Example 1, except that at the step (a2), the classifying condition was changed to set the average particle diameter of the modifying material B to 5 μm. Table 1 shows evaluation results of the electrode film.

Example 4

An electrode film was obtained by performing the same operation as in Example 1, except that at the step (b), the mixing ratio (mixture A:modifying material B) was changed to 97% by weight: 3% by weight. Table 1 shows evaluation results of the electrode film.

Comparative Example 1

80 parts by weight of an activated carbon (average particle diameter: 25 μm, coconut shell activated carbon), 10 parts by weight of a conductive carbon black (Ketchen black EC, manufactured by Ketchen Black International Company), and 10 parts by weight of PTFE (POLYFLON D-1E, manufactured by Daikin Industries, Ltd.) were mixed together. Additionally, 150 parts by weight of a forming aid (ethanol) was added, and these were kneaded at 20° C.

The obtained kneaded product was extruded and molded under the condition of an extrusion rate of 6000 mm/min to form a rod-shaped preformed body in which a cross section perpendicular to a longitudinal direction of the rod had an oval shape having a diameter of 18 mm in a compression direction and a diameter of 32 mm in a lateral direction orthogonal to the compression direction and the rog had a length of 1 m. The obtained rod-shaped preformed body was rolled by roll rolling under conditions of a rolling roll temperature of 40° C. and a pressure of 440 kg/cm, thereby obtaining a sheet having a thickness of 0.8 mm and a width of 150 mm. The obtained sheet was furthermore rolled and dried at 120° C. for 12 hours to obtain an electrode film having an average thickness of about 200 μm. Table 1 shows evaluation results of the electrode film.

Comparative Example 2

An electrode film was obtained by performing the same operation as in Example 1, except that at the step (a2), the classifying condition was changed to set the average particle diameter of the modifying material B to 3 μm. Table 1 shows evaluation results of the electrode film. Powder fall was significant, and it was thus impossible to measure internal resistance and electrostatic capacitance.

Comparative Example 3

An electrode film was obtained by performing the same operation as in Example 1, except that at the step (b), the mixing ratio (mixture A:modifying material B) was changed to 50% by weight: 50% by weight. Table 1 shows evaluation results of the electrode film.

Comparative Example 4

An electrode film was obtained by performing the same operation as in Example 1, except that at the step (b), the mixing ratio (mixture A:modifying material B) was changed to 0% by weight: 100% by weight (in other words, the mixture A was not used at the step (b)). However, there was a hole in the electrode film, and it was impossible to evaluate the electrode film.

TABLE 1

| | Modifying material | | | Electrode film | | | | |
|---|---|---|---|---|---|---|---|---|
| | Average particle diameter (μm) | Angle of repose (°) | Ratio (% by weight) | Bulk density (g/cm$^3$) | Internal resistance (Ω) | Electrostatic capacitance (F/cm$^3$) | Powder fall | Strength (MPa) |
| Ex. 1 | 90 | 44 | 30 | 0.55 | 31 | 14.5 | AA | 0.64 |
| Ex. 2 | 50 | 43 | 10 | 0.56 | 30 | 15.0 | BB | 0.75 |
| Ex. 3 | 5 | 42 | 30 | 0.58 | 28 | 15.7 | BB | 0.74 |
| Ex. 4 | 90 | 44 | 3 | 0.54 | 32 | 14.6 | AA | 0.64 |
| Comp. Ex. 1 | — | — | — | 0.54 | 35 | 14.5 | AA | 0.35 |
| Comp. Ex. 2 | 3 | 47 | 10 | 0.57 | — | — | CC | — |

TABLE 1-continued

| | Modifying material | | | Electrode film | | | | |
|---|---|---|---|---|---|---|---|---|
| | Average particle diameter (μm) | Angle of repose (°) | Ratio (% by weight) | Bulk density (g/cm$^3$) | Internal resistance (Ω) | Electrostatic capacitance (F/cm$^3$) | Powder fall | Strength (MPa) |
| Comp. Ex. 3 | 90 | 44 | 50 | 0.56 | 33 | 14.1 | CC | 0.50 |
| Comp. Ex. 4 | 90 | 44 | 100 | — | — | — | CC | — |

The invention claimed is:

1. A method for producing an electrode film for an electric double-layer capacitor, the method comprising:
    a step (a1) of kneading a carbonaceous powder, a conductive assistant, and a fluororesin binder, and producing a shaped product;
    a step (a2) of pulverizing the shaped product to produce a modifying material having an average particle diameter of 5 to 100 μm;
    a step (b) of producing a kneaded product by kneading together a carbonaceous powder, a conductive assistant, a fluororesin, and the modifying material having the average particle diameter of 5 to 100 μm in a ratio of 1 to 40% by weight of the modifying material with respect to 100% by weight in total of the carbonaceous powder, the conductive assistant, the fluororesin, and the modifying material, and rolling the kneaded product to produce an electrode film for an electric double-layer capacitor; and
    irradiating the shaped product or a pulverized product thereof with an electron beam at the step (a2).

2. The method for producing an electrode film for an electric double-layer capacitor of claim 1, wherein the modifying material has an angle of repose of 45 degrees or less.

* * * * *